J. GOOD.
WATER CIRCULATING SYSTEM FOR INTERNAL COMBUSTION ENGINES.
APPLICATION FILED MAY 6, 1915.
1,359,694.
Patented Nov. 23, 1920.
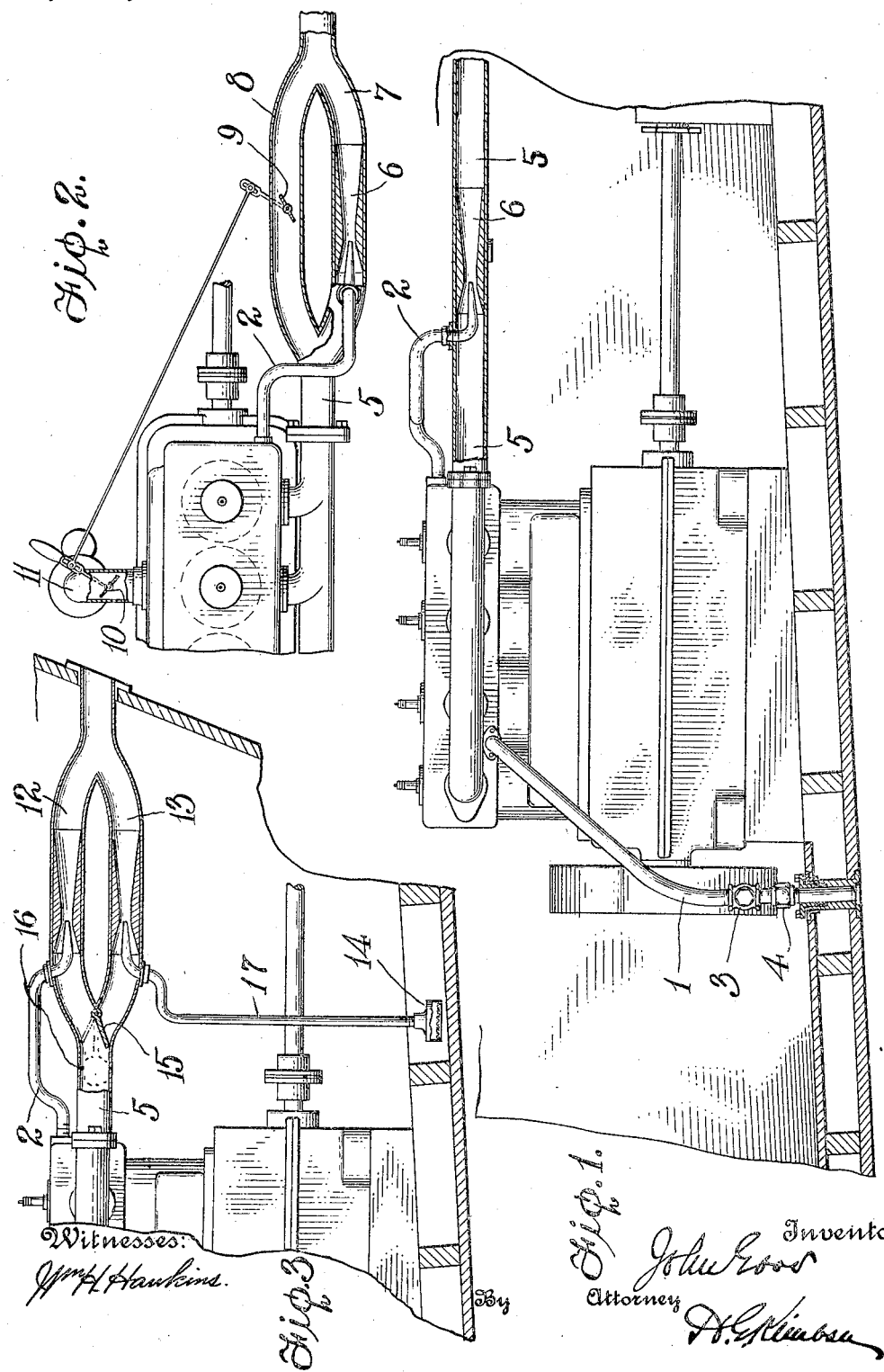

UNITED STATES PATENT OFFICE.

JOHN GOOD, OF BROOKLYN, NEW YORK.

WATER-CIRCULATING SYSTEM FOR INTERNAL-COMBUSTION ENGINES.

1,359,694.  Specification of Letters Patent.  Patented Nov. 23, 1920.

Application filed May 6, 1915. Serial No. 26,261.

*To all whom it may concern:*

Be it known that I, JOHN GOOD, a citizen of the United States, residing in Brooklyn, New York, have invented the following-described Improvements in Water-Circulating Systems for Internal-Combustion Engines.

The invention provides a simple, economic and effective means for moving the cooling water through the jackets of internal combustion engines, particularly such engines when used for propulsion of boats, and the invention consists in the application and utilization of the principles hereinafter set forth.

In the drawings filed herewith,—

Figure 1 is a side elevation of a marine engine having the invention applied;

Fig. 2 is a partial diagrammatic view of a developed form of the invention, and

Fig. 3 is a further development thereof.

Referring to Fig. 1, the marine engine is represented as a four-cycle combustion engine of any ordinary or suitable type provided with the usual water jacket, to which the water enters from a water inlet pipe 1 and from which it issues through an outlet pipe 2. The inlet pipe is connected with the body of water outside the boat through a check valve 3 and a strainer 4. The exhaust pipe 5 of the engine is equipped with a Venturi contraction or tube 6, the purpose of which is to establish a region of relative depression of pressure within the exhaust pipe according to principles which are well known and do not require explanation. The said region of low pressure exists in greatest measure at the narrowest part of the Venturi tube and is less than atmosphere, more or less, depending upon the velocity of the exhaust gases moving through the pipe. The water outlet pipe is furnished with a tapered nozzle projecting into and opening within this region of low pressure, and by virtue of the vacuum effect movement of water is induced through such pipe from the water jacket of the engine, and the inflow pipe 1, the water being discharged overboard with the exhaust gases, while serving at the same time, to prevent excessive temperature of the exhaust pipe and consequent injury to the woodwork of the boat. The water jacket spaces of the engine are not specifically illustrated herein because they are well understood and may be variously arranged according to the style and arrangement of the engine cylinders.

In the form of Fig. 2, the exhaust pipe 5 is branched in two sections 7 and 8. In the former section is contained the means for producing the local depression, above referred to and the outlet nozzle of the water cooling system debouches in such depression region, producing flow of water in the manner already described. The other branch passage or by-pass 8 is equipped with a throttle valve 9 connected by suitable linkage to the engine throttle 10 in the main intake 11, which latter throttle controls the fuel supply to the engine. By virtue of the linkage, the exhaust throttle 9 is closed by the closing of the main throttle and in the proper relation to increase the velocity of the gas flow through the passage 7 to such extent as will preserve therein the requisite depression to move the water. The character of the linkage is relatively unimportant and is indicated merely diagrammatically in the drawing. When the throttle 9 is open the depression at the water nozzle will be understood to be sufficient to cool the engine properly; the passing of a larger proportion of the gases through the venturi, by the closing of the throttle, serves to maintain that condition when the engine is idling or running at a slower speed. An adequate water flow is thus maintained for all conditions of engine operation, and at no time need energy be wasted in producing greater change of water than is necessary to abstract the heat developed. The valve-controlled venturi thus constitutes a variable water-moving mechanism coördinated with the engine itself to maintain automatically either a constant flow (for all speeds) or a variable flow, depending upon the character of the linkage. It will be obvious that the relative control of one throttle upon the other, as effected by the linkage, can be fixed to determine a relatively slower water flow at high speeds and a relatively faster flow at low speeds, that is to say, non-proportional to the engine speed and thereby the system herein described becomes in effect equivalent to an engine driven pump, automatically slowed down, relatively to the engine, at high speeds, and quickened at low speeds, to gain the maxmium cooling effect with the least mechanism.

In Fig. 3, I have illustrated a further development of the invention wherein the branch passages 12 and 13 of the exhaust pipe 5 are both provided with Venturi contractions, the former serving to establish a local pressure depression at the nozzle of the water pipe 2 and the latter at the outlet of a water pipe 17, which pipe is adapted to lift bilge water from the bottom of the boat, this water pipe being provided with a strainer 14 at its entrance. The two branch passages 12 and 13 are controlled by a gate valve 15 or otherwise which, in the present case, is subject to the action of a weight or spring 16 tending to close the passage 13 and open the passage 12. In this arrangement the cooling water is normally drawn through the water jacket as above described, but on such occasion as may be required, the valve 15 can be moved to the position to close the passage 12 and open the passage 13, thereby serving to raise the bilge water and discharge it from the boat through the exhaust pipe. Inasmuch as the branch 13 is intended only for occasional use, and in immediate control of the operator, the temporary suspension of the flow of cooling water need not result in excessive temperature in the engine, and if it does, the valve 15 may, of course, be turned in the other direction, or held in an appropriate intermediate position, to restore the cooler condition. The valve 15 in this arrangement, as also in the form of Fig. 2, constitutes a controlling agency whereby the exhaust gases may be caused to pass through a Venturi contraction under the control of the operator and to such extent as conditions may require.

From the foregoing description, the principles of the invention will be recognized without further explanation and it will be understood that there is no intentional limitation to the specific form of apparatus herein shown and used in illustration of the said principles, and it will also be understood that the form and shape of the Venturi contraction may be variously designed according to the conditions, being either inserted in the exhaust pipe as indicated or formed therein as preferred.

I claim:

1. The combination with the water jacket and exhaust pipe of an internal combustion engine, of a flow connection from the jacket to a region of local pressure depression in the said exhaust pipe whereby the exhaust gas withdraws and carries with it the waste engine-cooling water.

2. The combination with the water jacket and exhaust pipe of an internal combustion engine, of a Venturi contraction in the said exhaust pipe, and a flow connection between the jacket and the region of pressure depression in said Venturi contraction, whereby the exhaust serves to move the engine cooling water.

3. In a marine power plant, the combination with an internal combustion engine having a water cooling system and an escape pipe for the exhaust gases, a Venturi tube, suitable controlling agencies whereby the exhaust gases may be caused to pass through said tube and a flow connection from the water jacket to the region of pressure depression in said tube, whereby flow of water is induced from the water jacket into the exhaust pipe and thence outboard.

4. The combination of an internal combustion engine having an exhaust pipe and Venturi contraction in said pipe, of a water pipe having a nozzle debouching in the region of pressure depression in said Venturi contraction whereby movement of water is induced through said water pipe into the exhaust pipe.

5. The combination with a water jacketed internal combustion engine, of an exhaust pipe, a Venturi tube through which the exhaust gases may travel to establish a region of local pressure depression, a flow connection from the water jacket to the region of pressure depression in said tube, and means for automatically controlling the degree of such depression in accordance with the speed of the engine.

In testimony whereof, I have signed this specification in the presence of two witnesses.

JOHN GOOD.

Witnesses:
R. L. BRANT,
G. A. TAYLOR.